United States Patent Office.

WILLIAM C. HURD, OF NEW YORK, N. Y.

Letters Patent No. 82,416, dated September 22, 1868.

IMPROVEMENT IN THE MANUFACTURE OF PAINT.

The Schedule referred to in these Letters Patent and making part of the same.

TO ALL WHOM IT MAY CONCERN:

Be it known that I, WILLIAM C. HURD, of the city, county, and State of New York, have invented a new useful composition of matter, viz, an Improved Paint; and I hereby declare that the following is a full and clear description of the same.

Take the best feldspar that can be obtained, roast or bake to soften and whiten it, then grind to a fine powder resembling flour in appearance. Then mix or grind the powdered feldspar with oil and lead, zinc, or any other suitable material for paints or colors. The proportion of feldspar to be used, depends upon the other articles with which it is to be combined, varying from twenty to eighty per cent. For making the feldspar into some kinds of paint, it is improved by adding to each gallon of linseed-oil about one pint of dissolved linseed-gum or saponaceous oil. Paint thus compounded is very elastic, adhesive, and more durable than any other paint with which I am acquainted.

What I claim as my invention, and desire to secure by Letters Patent, is—

1. The combination of feldspar with oil and lead, zinc, or any other suitable material for paints or colors, substantially as set forth.

2. The addition of dissolved linseed-gum or saponaceous oil, mixed with linseed oil in the grinding, or mixing feldspar with any other suitable materials for paints or colors, substantially as set forth.

In testimony whereof, I have signed my name to this specification in the presence of two subscribing witnesses.

WILLIAM C. HURD.

Witnesses:
 ALVAN HYDE,
 GEO. A. FROST.